July 20, 1954 — N. N. STRÅTVEIT — 2,684,036
ROTARY MACHINE
Filed Feb. 14, 1949 — 2 Sheets-Sheet 1

INVENTOR:
Nils Nilsen Stråtveit
By E. F. Wenderoth
ATTORNEY

July 20, 1954  N. N. STRÅTVEIT  2,684,036
ROTARY MACHINE

Filed Feb. 14, 1949  2 Sheets-Sheet 2

Inventor:
Nils Nilson Stråtveit,
By Wenderoth, Lind & Ponack.
Attorneys

Patented July 20, 1954

2,684,036

UNITED STATES PATENT OFFICE 2,684,036

ROTARY MACHINE

Nils Nilsen Stråtveit, Oslo, Norway

Application February 14, 1949, Serial No. 76,358

13 Claims. (Cl. 103—131)

This invention relates to rotary machines having a radially non-symmetrical piston that does not rotate about its own axis.

Machines of the said type have not been much used, and a main reason for this fact are the vibrations and the noise which occur when the machines operate.

An object of the present invention is to reduce the vibrations and the noise that are due to the movement of the piston.

According to the invention this is obtained by such distribution of the masses of the piston and of masses rigidly connected with the piston that the momentum of the resultant of the mass forces of the piston and the parts integral with the same about the axis of its bearing is substantially zero.

In many cases the piston is of annular shape and provided with an axial slot, and due to this slot the piston is not radially symmetrical. In such cases the object of the invention may be obtained by making the inner and the outer cylinder surface of the piston eccentrical in relation to each other, and in such manner that the thickness of the wall becomes largest adjacent to the slot. The non-symmetry of the piston needs, however, not be due to such a slot, but may for example be due to the fact that the piston is provided with lugs for attachment of guide members or the like. Also in such cases the piston may be balanced by an eccentrical arrangement of the inner and the outer cylindrical surfaces of the piston in relation to each other.

The invention also comprises other methods of balancing the piston, which will be described below in connection with the drawing, that illustrates embodiments by way of example.

Figure 1:
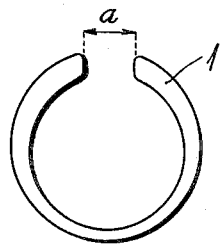
Figure 1 is a side view of a piston according to the invention.

In Figure 1 is shown a piston having a slot therein, the width of which is designated by $a$. The inner and the outer cylindrical surfaces of the piston are arranged eccentrically in relation to each other, so that the piston is thicker near the slot than at the opposite part thereof. The eccentricity is given such value that the momentum of the resultant of the mass forces of the piston and the parts integral with the same about the axis of its bearing become substantially zero.

Figure 2:
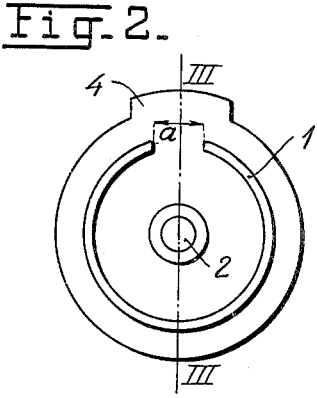
Figures 2 and 3 are side view and section taken along line III—III on Figure 2 respectively of another embodiment of the invention.
Figure 3:
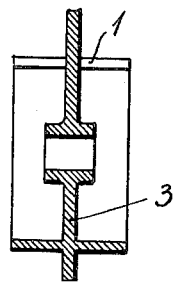

Figures 2 and 3 illustrate another embodiment. These figures show a piston 1 which is connected to the crank 2 of the machine by means of a disc 3 that extends through the piston and through the outer cylinder wall. This disc carries a mass 4. The dimensions of the disc and of the mass are so chosen that the momentum of the resultant of the mass forces of the piston and the parts integral with the same about the axis of its bearing become substantially zero. Instead of placing the mass 4 on the disc, the disc proper may be so dimensioned and arranged (for example eccentrically in relation to the piston) that the momentum of the resultant of the mass forces of the piston and the parts integral with the same about the axis of its bearing becomes substantially zero. A corresponding arrangement may be used in cases where the piston is attached to a disc that is placed at the end of the piston, instead of at the middle thereof as shown in Figures 2 and 3.

Still another method of obviating vibrations due to the piston consists in using different materials in the piston or in the disc, if a disc is used, so that the specific gravity of the material opposite to the slot is higher than that of the material adjacent to the slot.

Figure 4:
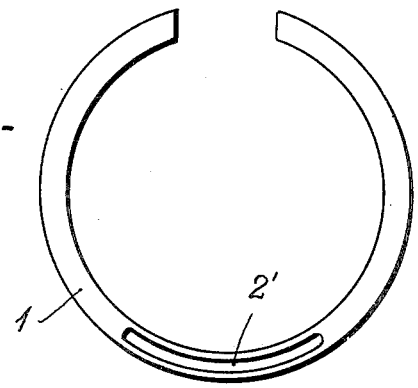
Figure 4 is a side view of still another embodiment.

Figure 4 illustrates still another embodiment, where cut-outs 2' are provided in the material opposite to the slot. Such cut-outs may be provided in any convenient manner, and are so dimensioned that the momentum of the resultant of the mass forces of the piston and the parts integral with the same about the axis of its bearing becomes substantially zero.

Figure 5:
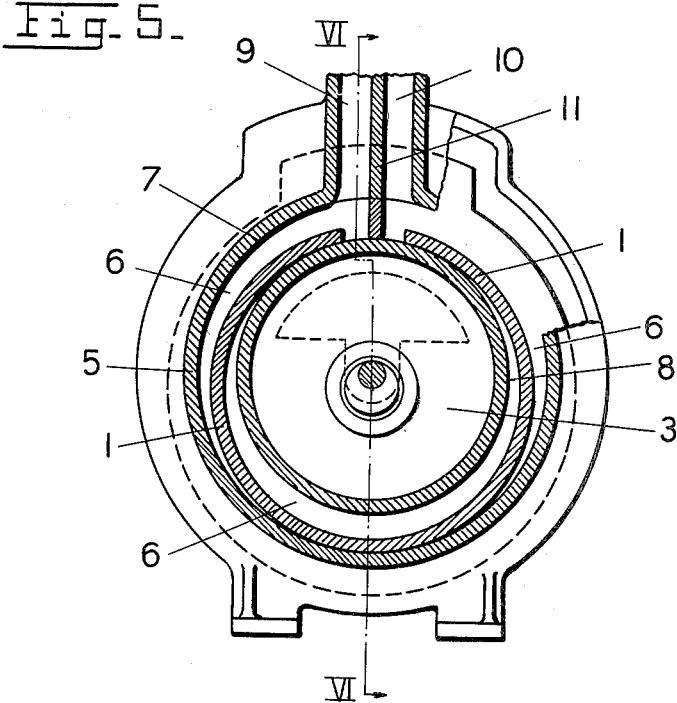
Figure 5 is a transverse cross-section through a machine using a piston according to Figures 2 and 3, taken on the line V—V of Figure 6.
Figure 6:
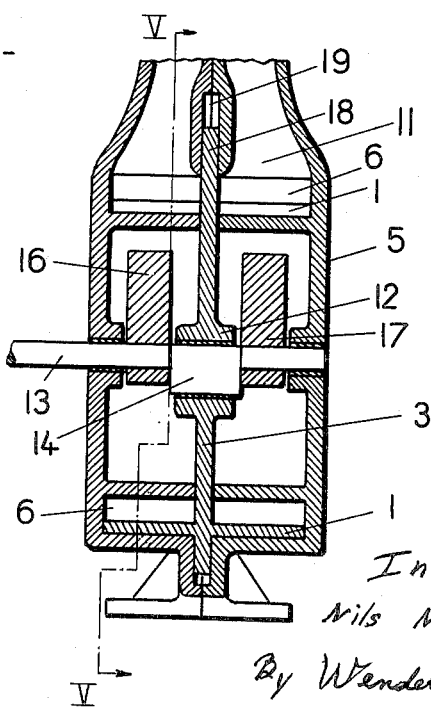
Figure 6 is a longitudinal cross-section taken on the line VI—VI of Figure 5.

The machine shown in Figs. 5 and 6 comprises a housing 5 with an annular working chamber 6. In radial direction the working chamber is limited by the cylindrical walls 7, 8. Between the inlet and outlet openings 9 and 10, a radial wall 11 is arranged, this divides the working chamber into high and low pressure sides. The piston 1 is annular and is arranged eccentrically in the working chamber 6. The piston 1 is provided with a plate 18, extending into a slot 19 in the radial wall 11. A radial disc 3 is mounted in the piston 1, this disc carries the bearing 12. The driving-shaft 13 has an eccentric portion 14 on which the bearing 12 is journaled.

Counterbalancing weights 16, 17 are carried by the shaft 13.

As will be understood two or more of the methods here shown may be used in combination with each other.

Not only an unsymmetry of the piston but also the resultant mass force of the piston may cause vibrations. This force is a rotating force and it has previously been sought to balance the same by rotating counter-weights, which are placed outside of the working space. A feature of the present invention consists therein that the space within the inner cylinder is utilized by placing counter-weights therein. In the various forms the piston executes a planetary non-rotating movement.

I claim:

1. A rotary machine having a radially unsymmetrical piston having a planetary non-rotating movement relative to its axis, piston masses and parts rigidly connected therewith so located and proportioned as to balance said unsymmetrical piston so that the momentum of the resultant of the mass forces of the piston and the parts rigidly connected therewith about the axis of its bearing is substantially zero and not liable to vibration.

2. A rotary machine as claimed in claim 1, in which said piston is provided with inner and outer cylindrical surfaces eccentrical in relation to each other.

3. A rotary machine as claimed in claim 1, in which the piston is connected with a planar radial disc, having at least one balancing mass attached to the disc, the disc proper and said balancing mass being so dimensioned and proportioned that momentum of the resultant of the mass forces of the piston and parts rigidly connected with the same about the axis of said piston is substantially zero.

4. A rotary machine as claimed in claim 1, in which the piston masses consists of materials of different specific gravities in different areas thereof.

5. A rotary machine as claimed in claim 1, in which cut-outs are provided in areas of said piston so located and proportioned as to balance said unsymmetrical piston so that the momentum of the resultant of the mass forces of the piston and said parts about the axis of its bearing becomes substantially zero.

6. A rotary machine as claimed in claim 1, wherein inner and outer walls forming an annular working chamber for said piston is provided and counterweights are provided for balancing said piston, said counterweights being located within said inner wall.

7. A rotary machine as claimed in claim 1 in which said piston is connected with a planar radial disc so dimensioned and proportioned that the momentum of the resultant of the mass forces of the piston and parts rigidly connected with the same about the axis of said piston is substantially zero.

8. A power machine or pump comprising inner and outer walls forming an annular working chamber, a radial wall dividing said chamber into high and low pressure sides, inlet and outlet openings being formed on each side of said wall, a ring-shaped piston in said chamber having an axially extending opening through which extends said wall, parts integral with said piston, a driving shaft, said piston being mounted non-rotatably in relation to said working chamber on said driving shaft eccentrically in relation to said shaft and said working chamber and having a movement at right angles to its axis, and in contact in a line with said walls of said chamber, a rotation of said shaft providing for a movement of said contact line around the inside of the said chamber and a circular movement of each part of said piston about individual centers, said piston and parts integral therewith being so located and proportioned as to balance said piston so that the momentum of the resultant of the mass forces of the piston and the parts integral with the same about the axis of the piston is substantially zero.

9. A machine as claimed in claim 8 and including a planar radial disc connected to said piston, a mass connected to said disc eccentric to the axis thereof and dimensioned with said piston whereby the momentum of the resultant of the mass forces of the piston and said disc with said mass about the axis of said piston is substantially zero.

10. A machine as claimed in claim 8 and including the counterweights on said shaft arranged internally of the inner wall of said annular working chamber within which said piston is housed.

11. An improved unsymmetrical piston for a rotary power machine having a planetary non-rotating movement relative to its axis wherein each point of said piston describes a circle with equal diameters and said piston having such location and proportionment of the mass thereof that the momentum of the resultant of the mass forces of said piston about the axis of its bearing is substantially zero and not liable to vibration.

12. An improved unsymmetrical piston for a rotary pump, compressor or power machine having a planetary non-rotating movement relative to its axis wherein all points of the piston will describe curves lying in planes perpendicular to the axis of said piston, said curves being circles all having the same diameter and said piston having such location and proportionment of the mass thereof so that the mass forces of the piston during operation are balanced.

13. An improved piston for a rotary machine such as a pump, and the like, adapted to be driving or driven by gaseous or fluid media comprising a bearing for said piston, a drive crank shaft upon which said bearing is mounted, controlling means connected to the piston for controlling the movement of the piston at right angles to its axis so that each point of the piston will describe circles of equal diameters, said piston having a slot therein and said piston having such location and proportionment of the mass and of parts integral therewith that the momentum of the resultant of the mass forces of the piston with reference to the axis of the bearing of the piston is substantially zero.

References Cited in the file of this patent

UNITED STATES PATENTS

| Number | Name | Date |
|---|---|---|
| 358,832 | Allyn | July 10, 1888 |
| 453,641 | Johnson | June 9, 1891 |
| 985,562 | Williams | Feb. 28, 1911 |
| 1,378,065 | Varley | May 17, 1921 |
| 1,601,846 | Boutell | Oct. 5, 1926 |
| 1,636,486 | Planche | July 19, 1927 |
| 1,851,036 | Bruegger | Mar. 29, 1932 |
| 1,885,631 | Buren | Nov. 1, 1932 |
| 1,939,778 | Jardine | Dec. 19, 1933 |

FOREIGN PATENTS

| Number | Country | Date |
|---|---|---|
| 67,325 | Sweden | Apr. 22, 1927 |
| 218,852 | Great Britain | July 17, 1924 |
| 508,954 | France | Aug. 5, 1920 |
| 575,709 | France | Apr. 26, 1924 |
| 582,267 | France | Oct. 11, 1924 |
| 642,074 | Germany | Feb. 24, 1937 |